United States Patent
Khan et al.

(10) Patent No.: US 10,489,846 B2
(45) Date of Patent: *Nov. 26, 2019

(54) METHODS, SYSTEMS, AND COMPUTER READABLE MEDIA FOR DETECTING CUSTOMER PRESENCE TO INITIATE THE ORDERING AND PURCHASE OF GOODS AND SERVICES

(71) Applicant: MasterCard International Incorporated, Purchase, NY (US)

(72) Inventors: Mohammad Khan, San Jose, CA (US); Kaushik Roy, Foster City, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/250,697

(22) Filed: Aug. 29, 2016

(65) Prior Publication Data

US 2017/0053339 A1    Feb. 23, 2017

Related U.S. Application Data

(63) Continuation of application No. 13/220,360, filed on Aug. 29, 2011, now Pat. No. 9,430,786.
(Continued)

(51) Int. Cl.
*G06Q 30/00* (2012.01)
*G06Q 30/06* (2012.01)
(Continued)

(52) U.S. Cl.
CPC ....... *G06Q 30/0633* (2013.01); *G06Q 20/102* (2013.01); *G06Q 20/3224* (2013.01);
(Continued)

(58) Field of Classification Search
CPC .................................................. G06Q 30/06–08
(Continued)

(56) References Cited

U.S. PATENT DOCUMENTS 6,435,406 B1    8/2002    Pentel
6,505,774 B1    1/2003    Fulcher et al.
(Continued)

FOREIGN PATENT DOCUMENTS

KR    10-2008-002835    1/2008
KR    10-2009-0000735    1/2009
(Continued)

OTHER PUBLICATIONS

Advisory Action for U.S. Appl. No. 13/118,046 (dated Jan. 4, 2018).
(Continued)

*Primary Examiner* — Ethan D Civan
(74) *Attorney, Agent, or Firm* — Jenkins, Wilson, Taylor & Hunt, P.A.

(57) ABSTRACT

Methods, systems, and computer readable media for detecting customer presence to initiate the ordering and purchase of goods and services are disclosed. In one example, a system includes a detection server configured to detect the presence of a mobile device in a designated area associated with a merchant location and for initiating a menu selection application in the mobile device for placing an order for at least one product. The system further includes a merchant server configured to receive, from the mobile device, purchase order data associated with the order for the at least one product, a customer identifier associated with the mobile device, and a location identifier associated with the designated area, and for utilizing the customer identifier to send a notification message that indicates that the at least one product is available to the mobile device.

13 Claims, 3 Drawing Sheets

Related U.S. Application Data (60) Provisional application No. 61/377,786, filed on Aug. 27, 2010.

(51) Int. Cl.
| | |
|---|---|
| *G06Q 50/12* | (2012.01) |
| *H04W 4/021* | (2018.01) |
| *G06Q 20/10* | (2012.01) |
| *G06Q 20/32* | (2012.01) |
| *G06Q 20/36* | (2012.01) |

(52) U.S. Cl.
CPC ............ *G06Q 20/36* (2013.01); *G06Q 30/06* (2013.01); *G06Q 30/0641* (2013.01); *G06Q 50/12* (2013.01); *H04W 4/021* (2013.01)

(58) Field of Classification Search
USPC ............................................. 705/26.1–27.2
See application file for complete search history.

(56) References Cited

U.S. PATENT DOCUMENTS

| | | | |
|---|---|---|---|
| 8,060,413 B2 | 11/2011 | Castell et al. | |
| 8,184,019 B2 | 5/2012 | Chauvin et al. | |
| 8,626,591 B2 | 1/2014 | Ablowitz et al. | |
| 9,430,786 B2 * | 8/2016 | Khan | G06Q 30/06 |
| 9,697,651 B2 | 7/2017 | Khan | |
| 9,760,943 B2 | 9/2017 | Khan | |
| 2002/0032601 A1 | 3/2002 | Admasu et al. | |
| 2002/0095333 A1 | 7/2002 | Jokinen et al. | |
| 2002/0143638 A1 | 10/2002 | August et al. | |
| 2003/0050854 A1 | 3/2003 | Showghi et al. | |
| 2004/0054591 A1 | 3/2004 | Spaeth et al. | |
| 2004/0054592 A1 | 3/2004 | Hernblad | |
| 2004/0158499 A1 | 8/2004 | Dev et al. | |
| 2004/0243519 A1 | 12/2004 | Perttila et al. | |
| 2005/0222961 A1 | 10/2005 | Staib et al. | |
| 2006/0218040 A1 * | 9/2006 | Sabapathypillai | G06Q 30/06 705/15 |
| 2007/0016479 A1 | 1/2007 | Lauper | |
| 2007/0030824 A1 | 2/2007 | Ribaudo et al. | |
| 2007/0205278 A1 | 9/2007 | Lovett | |
| 2007/0224979 A1 | 9/2007 | O'Neal et al. | |
| 2008/0114884 A1 | 5/2008 | Hewes et al. | |
| 2008/0126261 A1 | 5/2008 | Lovett | |
| 2008/0192932 A1 | 8/2008 | Graeber et al. | |
| 2008/0262929 A1 | 10/2008 | Behr | |
| 2009/0112765 A1 | 4/2009 | Skowronek | |
| 2009/0216606 A1 | 8/2009 | Coffman et al. | |
| 2009/0281903 A1 | 11/2009 | Blatstein | |
| 2009/0288012 A1 | 11/2009 | Hertel et al. | |
| 2010/0070365 A1 | 3/2010 | Siotia et al. | |
| 2010/0075666 A1 | 3/2010 | Garner | |
| 2011/0015934 A1 | 1/2011 | Rowe et al. | |
| 2011/0082746 A1 | 4/2011 | Rice et al. | |
| 2011/0084804 A1 * | 4/2011 | Khorashadi | H04L 67/18 340/8.1 |
| 2011/0258058 A1 | 10/2011 | Carroll et al. | |
| 2011/0264490 A1 | 10/2011 | Durvasula et al. | |
| 2011/0276511 A1 * | 11/2011 | Rosenberg | G06Q 20/20 705/345 |
| 2011/0320243 A1 | 12/2011 | Khan | |
| 2012/0005026 A1 | 1/2012 | Khan et al. | |
| 2012/0059741 A1 | 3/2012 | Khan et al. | |
| 2012/0072311 A1 | 3/2012 | Khan | |
| 2018/0130265 A1 | 5/2018 | Khan | |

FOREIGN PATENT DOCUMENTS

| | | | |
|---|---|---|---|
| WO | WO 2006/055721 A2 | 5/2006 | |
| WO | WO 2009/158681 A1 | 12/2009 | |
| WO | WO 2011/150369 A2 | 12/2011 | |
| WO | WO 2012/027748 A2 | 3/2012 | |

OTHER PUBLICATIONS

Final Office Action for U.S. Appl. No. 13/118,046 (dated Oct. 24, 2017).
Decision to refuse a European Patent Application and Provision of the minutes in accordance with Rule 124(4) EPC for European Patent Application No. 11 820 781.0 (dated Oct. 5, 2017).
Appeal Board Decision for U.S. Appl. No. 13/118,046 (dated Sep. 14, 2016).
Advisory Action Before the Filing of an Appeal Bried for U.S. Appl. No. 13/171,136 (dated Sep. 14, 2016).
Summons to Attend Oral Proceedings pursuant to Rule 115(1) EPC for European Patent Application No. 11 787 521.1 (Jun. 29, 2016).
Final Office Action for U.S. Appl. No. 13/171,136 (dated Jun. 21, 2016).
Examiner initated Interview Summary & Office Communication for U.S. Appl. No. 13/220,360 (dated May 19, 2016).
Notice of Allowance & Fee(s) Due for U.S. Appl. No. 13/220,360 (dated Apr. 28, 2016).
Examiner's Answer for U.S. Appl. No. 13/118,046 (dated Apr. 4, 2016).
Applicant-Initated Interview Summary for U.S. Appl. No. 13/236,243 (dated Mar. 16, 2016).
Advisory Action Before the Filing of Appeal Brief for U.S. Appl. No. 13/236,243 (dated Mar. 4, 2016).
Final Office Action for U.S. Appl. No. 13/236,243 (dated Dec. 23, 2015).
Non-Final Office Action for U.S. Appl. No. 13/171,136 (dated Dec. 22, 2015).
Communication pursuant to Article 94(3) EPC for European Application No. 11 787 521.1 (dated Dec. 17, 2015).
Advisory Action for U.S. Appl. No. 13/220,360 (dated Oct. 1, 2015).
Communication pursuant to Article 94(3) EPC for European Application No. 11 820 781.0 (dated Sep. 17, 2015).
Applicant-Initiated Interview Summary for U.S. Appl. No. 13/220,360 (dated Sep. 10, 2015).
Applicant-Initiated Interview Summary for U.S. Appl. No. 13/171,136 (dated Sep. 3, 2015).
Communication pursuant to Article 94(3) EPC for European Application No. 11 787 521.1 (dated Jul. 15, 2015).
Non-Final Office Action for U.S. Appl. No. 13/236,243 (dated Jun. 18, 2015).
Final Office Action for U.S. Appl. No. 13/220,360 (dated Jun. 4, 2015).
Final Office Action for U.S. Appl. No. 13/171,136 (dated Jun. 3, 2015).
Applicant-Initiated Interview Summary for U.S. Appl. No. 13/220,360 (dated Mar. 26, 2015).
Final Office Action for U.S. Appl. No. 13/118,046 (dated Feb. 27, 2015).
Applicant-Initiated Interview Summary for U.S. Appl. No. 13/118,046 (dated Jan. 23, 2015).
Non-Final Office Action for U.S. Appl. No. 13/220,360 (dated Dec. 18, 2014).
Non-Final Office Action for U.S. Appl. No. 13/171,136 (dated Nov. 12 2014).
Communication pursuant to Article 94(3) EPC for European Patent Application No. 11787521.1 (dated Oct. 27, 2014).
Non-Final Office Action for U.S. Appl. No. 13/118,046 (dated Sep. 25, 2014).
Interview Summary for U.S. Appl. No. 13/220,360 (dated Jul. 29, 2014).
Advisory Action for U.S. Appl. No. 13/236,243 (dated Jul. 17, 2014).
Non-Final Office Action for U.S. Appl. No. 13/220,360 (dated Jun. 27, 2014).
Final Office Action for U.S. Appl. No. 13/236,243 (dated Apr. 21, 2014).
Non-Final Office Action for U.S. Appl. No. 13/118,046 (dated Apr. 16, 2014).
Final Office Action for U.S. Appl. No. 13/220,3601 (dated Mar. 3, 2014).

(56) References Cited

OTHER PUBLICATIONS

Extended European Search Report for European Application No. 11787521.1 (dated Feb. 28, 2014).
Extended European Search Report for European Application No. 11820781.0 (dated Feb. 27, 2014).
Applicant-Initiated Interview Summary for U.S. Appl. No. 13/171,136 (dated Nov. 6, 2013).
Non-Final Office Action for U.S. Appl. No. 13/236,243 (dated Oct. 4, 2013).
Non-Final Office Action for U.S. Appl. No. 13/220,360 (dated Oct. 2, 2013).
Final Office Action for U.S. Appl. No. 13/118,046 (dated Oct. 2, 2013).
Advisory Action Before the Filing of an Appeal Brief for U.S. Appl. No. 13/171,136 (dated Sep. 11, 2013).
Final Office Action for U.S. Appl. No. 13/171,136 (dated Jun. 19, 2013).
Communication of European Publication Number and Information on the Application of Article 67(3) EPC for European Patent Application No. 11820781.0 (dated Jun. 5, 2013).
Communication of European Publication Number and Information on the Application of Article 67(3) EPC for European Patent Application No. 11787521.1 (dated Mar. 13, 2013).
Non-Final Official Action for U.S. Appl. No. 13/118,046 (dated Oct. 3, 2012).
Non-Final Official Action for U.S. Appl. No. 13/171,136 (dated Sep. 25, 2012).
Notification of Transmittal of the International Search Report and the Written Opinion of the International Searching Authority, or the Declaration for International Application No. PCT/US2011/049572 (dated May 1, 2012).
Notification of Transmittal of the International Search Report and the Written Opinion of the International Searching Authority, or the Declaration for International Application No. PCT/US2011/038408 (dated Feb. 29, 2012).
Latif et al., "Automated Notification and Document Downloading in E-Learning—Development of an Agent-Based Framework Utilizing the Push-Pull Technology Interaction Policy", International Symposium on Information Technology, IEEE, pp. 1-7, (Aug. 2008).
"Information technology—Telecommunications and information exchange between systems—Near Field Communications—Interface and Protocol (NFCIP-1)," ISO/IEC 18092, pp. 1-66 (Apr. 1, 2004).
"Identification cards—Contactless integrated circuit(s) cards—Proximity cards—Part 2: Radio frequency power and signal interface," ISO/IEC 14443-2, pp. 1-10 (Jul. 22, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollison," ISO/IEC 14443-3, pp. 1-48 (Jun. 11, 1999).
Notice of Allowance and Fee(s) Due for U.S. Appl. No. 13/171,136 (dated Mar. 9, 2017).
Applicant-Initiated Interview Summary for U.S. Appl. No. 13/236,243 (dated Feb. 24, 2017).
Summons to attend oral proceedings pursuant to Rule 115(1) EPC for European Application No. 11820781.0 (Feb. 8, 2017).
Communication pursuant to Article 94(3) EPC for European Application No. 11 787 521.1 (dated Feb. 6, 2017).
Non-Final Office Action for U.S. Appl. No. 13/236,243 (dated Nov. 17, 2016).
Terry, "Restaurants aim to boost sales with mobile apps," Nation's Restaurant News 43.8: 4(2), Lebhar-Friedman, Inc, pp. 1-3 (Mar. 2, 2009).
"PARX, a Subsidiary of OTI, and Neos Tech Introduce 'EasyPark' in Italy," PR Newswire, pp. 1-4 (Nov. 11, 2008).
"ViVOtech Launches ViVOpay Kiosk II for Rapid Integration of Contactless & NFC Technology with Customer-Facing Self-Service Payment Systems," Business Wire, pp. 1-4 (Nov. 4, 2008).
"Strix Systems and Digital Payment Technologies Partner in Wireless Parking Meter Solution," Business Wire, pp. 1-4 (Sep. 4, 2008).
"LiveOnTheGo.com Launches Wireless Application for Quick Food Ordering from a Web-Enabled Mobile Phone or PDA," Business Wire: NA. Business Wire, pp. 1-2 (Jan. 14, 2008).
"GoMobo.com Selects MX Telecom's Messaging Gateway for Text Message Food Order and Payment Service," Business Wire: NA. Business Wire, pp. 1-2 (Mar. 27, 2007).
Non-Final Office Action for U.S. Appl. No. 13/118,046 (dated Jun. 20, 2017).
Notice of Allowance and Fee(s) Due for U.S. Appl. No. 13/236,243 (dated May 8, 2017).
Communication pursuant to Article 94(3) EPC for European Patent Application Serial No. 10 827 606.4 (dated Feb. 28, 2018).
Summons to Attent Oral Proceedings Pursuant to Rule 115(1) EPC for European Patent Application Serial No. 11787521.1 (Feb. 20, 2018).
Non-Final Office Action for U.S. Appl. No. 13/118,046 (dated Nov. 13, 2018).
Decision to refuse a European Patent application for European Patent Application Serial No. 11 787 521.1 (dated Nov. 7, 2018).
Non-Final Office Action for U.S. Appl. No. 13/118,046 (dated Jul. 3, 2018).
Advisory Action for U.S. Appl. No. 13/118,046 (dated May 31, 2019).
First Examination Report for Indian Patent Application Serial No. 4728/CHENP/2012 (dated Mar. 27, 2019).
Final Office Action for U.S. Appl. No. 13/118,046 (dated Mar. 19, 2019).
Non-Final Office Action for U.S. Appl. No. 15/640,414 (dated Sep. 18, 2019).

* cited by examiner

METHODS, SYSTEMS, AND COMPUTER READABLE MEDIA FOR DETECTING CUSTOMER PRESENCE TO INITIATE THE ORDERING AND PURCHASE OF GOODS AND SERVICES

PRIORITY CLAIM

The present application is a continuation of U.S. patent application Ser. No. 13/220,360, filed Aug. 29, 2011, which claims the benefit of U.S. Provisional Patent Application Ser. No. 61/377,786, filed Aug. 27, 2010, the disclosures of each which are incorporated herein by reference in their entireties.

TECHNICAL FIELD

The subject matter described herein relates to the detection of wireless devices and triggering the wireless orders and purchases. More particularly, the subject matter described herein relates to methods, systems, and computer readable media for detecting customer presence to initiate the ordering and purchase of goods and services.

BACKGROUND

At present, a customer typically orders and purchases goods in-store or in a drive-thru window with the assistance of a human sales representative or cashier. However, both of these options used by merchant entities can prove to be quite cumbersome and expensive. For example, a customer must usually read through all the menu-options provided by the merchant entity (e.g., a retail store, fast food restaurant, etc.) in order to decide which option he/she would like to order and subsequently place an order at a point of sale counter manned by a sales employee using a traditional payment instrument, such as cash, a check, or a payment card. This process is not automated and can be inconvenient since the customer must interact with a salesperson that may make errors or may not be even be readily available at the point of sale counter or drive-thru window when the customer is ready to place an order for a product. Similarly, in many instances, a customer frequently visits the same store on different occasions and orders the same goods/service, yet must still order goods using means that require human interaction while placing the order.

Accordingly, there exists a need for methods, systems, and computer readable media for detecting customer presence to initiate the ordering and purchase of goods and services.

SUMMARY

According to one aspect, the subject matter described herein includes methods, systems, and computer readable media for detecting customer presence to initiate the ordering and purchase of goods and services. In one embodiment, a system includes a detection server configured to detect the presence of a mobile device in a designated area associated with a merchant location and for initiating a menu selection application in the mobile device for placing an order for at least one product. The system further includes a merchant server configured to receive, from the mobile device, purchase order data associated with the order for the at least one product, a customer identifier associated with the mobile device, and a location identifier associated with the designated area, and for utilizing the customer identifier to send a notification message that indicates that the at least one product is available to the mobile device.

As used herein, the terms "wireless smart device" and "NFC enabled device" may be synonymous and are intended to refer to any device enabled with near field communication (NFC), radio frequency (RF) communication, or barcode capturing capabilities to interact with a smart poster with the corresponding technology. In one aspect, wireless device reader may include a radio frequency (RF) reader. One type of wireless device that can wirelessly communicate to a wireless smart device reader is an NFC card or NFC handheld device, including but not limited to a smart phone. In near field communication, a wireless smart device may communicate with a wireless transceiver or wireless device reader via inductive coupling of the reader antenna to the device antenna. The two loop antennas effectively form a transformer. The reader amplitude-modulates the radio frequency (RF) field to send information to the device. The device communicates with the transceiver and/or reader by modulating the loading on the device antenna, which also modulates the load on the reader antenna. In a wireless smart device, the NFC handset may enable contactless payment, and a security element (SE) for ensuring secure transactions may be embedded, provided by a universal subscriber identity module (USIM), or provided as an add-on to, for example, a SD or a jacket. Wireless smart devices may communicate with a transceiver or wireless device reader using NFC. As used herein, the term "wireless communication" includes communication conducted at ISO 14443 and ISO 18092 interfaces. These specifications define communication protocols for wireless smart devices operating in close proximity with a reader antenna.

The subject matter described herein may be implemented in software in combination with hardware or in software in combination with hardware and firmware. For example, the subject matter described herein may be implemented in software executed by a hardware based processor. In one exemplary implementation, the subject matter described herein for detecting customer presence to initiate the ordering and purchase of goods and services may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
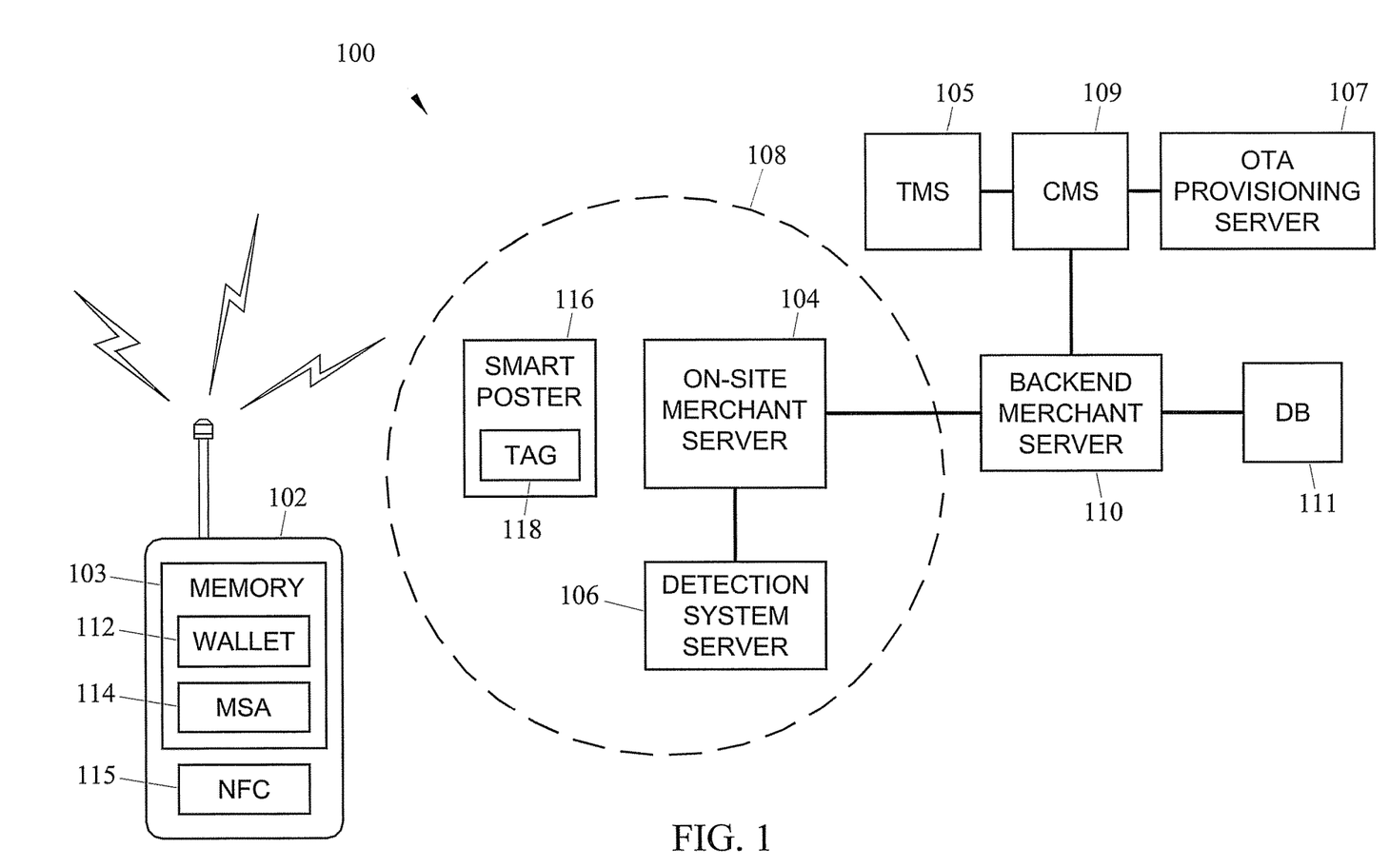
FIG. 1 is a block diagram illustrating an exemplary system for detecting customer presence to initiate the ordering and purchase of goods and services according to an embodiment of the subject matter described herein.

FIG. 1 is a schematic diagram illustrating an exemplary system 100 for facilitating the use of wireless smart devices to purchase products or services according to an embodiment described herein. Referring to FIG. 1, exemplary system 100 includes a mobile device 102 (e.g., a wireless smart device), a smart poster 116, an on-site merchant server 104 and associated database 111, a detection system server 106, a backend merchant server 110, a trigger management server (TMS) 105, a content management server (CMS) 109, and an over the air (OTA) provisioning server 107. In one embodiment, mobile device 102 is a near field communications (NFC) enabled mobile device or smart phone. Although CMS 109 and backend merchant server 110 are depicted as separate network elements in FIG. 1, hardware and software components responsible for CMS functionality may be integrated in merchant server 110 without departing from the scope of the present subject matter.

Smart poster 116 may include any suitable object that displays or advertises a particular product and is located in a place that is readily accessible by potential consumers or purchasers of goods and/or services. Smart poster 116 may be located inside and/or near a merchant establishment. Although FIG. 1 only depicts a smart poster 116, any other touch point (e.g., a radio frequency (RF) device reader located at an entrance, pickup area, parking spot, and a dining room table) may be used in system 100 without departing from the scope of the invention. For example, smart poster 116 may be located inside a restaurant establishment (such as Starbucks® or McDonald's®), at a store entrance, on a store wall, in a shopping aisle, at a pickup area, at a dining table, or other easily accessible location in or near the store. In another embodiment, a smart poster 116 may be located adjacent to an associated parking area or parking spot near a merchant establishment. In one embodiment, smart poster 116 may advertise food items or menu selections (e.g., a fast food combination meal or item) as well as including a smart tag 118 that is configured to provide related menu data. For example, by containing menu data that is accessible to mobile device 102 via a near field communications (NFC) interfacing (e.g., an NFC tap), smart poster 116 may allow for convenient ordering and purchasing options and thereby allowing consumers the option to bypass the cashier line. In one embodiment, mobile device 102 may include a hardware based NFC circuit module 115 and may utilize NFC circuit module 115 to interface with a smart tag 118 on smart poster 116 using near field communications.

In one embodiment, the present subject matter may be initiated upon the detection of a customer's presence and mobile device 102. In one embodiment, the customer's presence and mobile device 102 may be detected upon mobile device 102 interfacing (via NFC) with a touch point, such as smart poster 116. Alternatively, the customer's presence and mobile device 102 may be detected upon mobile device 102 entering a designated area 108 via a detection system server 106 associated with a merchant location. Both of these embodiments may utilize a wallet application 112 and/or menu selection application 114 stored in mobile device 102. In one embodiment, each of wallet application 112 and menu selection application 114 may include a software application or module (e.g., a MIDlet application) that is stored in memory 103 (either in a secure memory element and/or non-secure baseband memory) of mobile device 102, and when executed by a hardware based processor in mobile device 102 is capable of performing various functionalities. For example, wallet application 112 may utilize and manage multiple softcards stored on the mobile device, such as credit cards, debit cards, electronic loyalty cards, electronic loyalty reward certificates, electronic coupons, electronic tickets, and the like. Wallet application 112 may also be used to communicate information to TMS 105 and receive provisioned data from OTA provisioning server 107. Payment credentials, such as electronic payment softcards including credit or debit cards may also be stored in any suitable user defined priority within wallet application 112. For example, a user can configure wallet application 112 such that a Visa® debit card is always used as a first choice/priority. Alternatively, wallet application 112 may be programmed to use certain electronic payment softcards under certain conditions. For example, wallet application 112 may be programmed to conduct a purchase transaction using a Macys® softcard (e.g., an electronic software based card stored and displayed via device 102) when in a Macys® store. GPS triangulation, GSM triangulation, or WiFi triangulation methods applied to mobile device 102 could be used to determine when mobile device 102 is present in a certain location, such as a Macys® store (e.g., when device 102 is interfaces with a wireless reader in Macy's®). User preferences can be used to prioritize electronic softcards residing within wallet application 112. Wallet application 112 may also comprise an algorithm for submitting and paying for the order downloaded from smart poster 116. In one embodiment, wallet application 112 may, alone or with menu selection application 114, present the user with the following options upon being detected by system 100 (e.g., interfacing with a smart poster or an RF reader, or upon detection by detection system server 106): (i) the option to "Order and Pay", or (ii) the option to "Create and Submit Order" as described below. In one embodiment, menu selection application 114 (via wallet 112) to allow the customer to interface with mobile device 102 and place an order for meal/food/coffee/general products package(s) using menu displayed on the mobile device screen as well as to select individual items to add to the pre-defined meal, food item, beverage item, and general products package after mobile device 102 is detected by system 100. In one embodiment, consumers may select an option on the mobile device wallet 112 and/or menu selection application 114 to obtain information on each product displayed or listed on menu to get information or even obtain a related coupon/offer. In one embodiment, both the wallet application 112 and menu selection application 114 may include software applications that reside in a memory 103 or hardware storage component in mobile device 102 that may be executed by a hardware processor (not shown) in mobile device 102. In one embodiment, memory 103 may comprise at least one of a secure memory element and/or a non-secure baseband memory.

In one embodiment, mobile device 102 may be detected when the user interfaces mobile device 102 (e.g., taps) with the order menu displayed on smart poster 116, wherein each menu item on the order menu is associated with a smart tag 118 that comprises a passive NFC or RF tag device (e.g., a circuit device or wireless transceiver) that is powered by an interfacing mobile device 102. For example, after mobile device 102 is tapped or brought in close proximity with smart tag 118, smart tag 118 may be activated by obtaining power from the electromagnetic field generated by mobile device 102. In other embodiments, smart tag 118 may include an active RF tag or reader equipped with its own power source (e.g., a battery). Whether passive or active, smart tag 118 is capable of communicating smart poster content information to an interfacing mobile device 102. In one embodiment, the smart poster content information may include a product selection identifier (e.g., a menu item identifier), a content provider code (CLC), a tag location code (TLC), and a location identifier (e.g., an IP address, a URL, a URI, and the like) associated with TMS 105, all of which may be provided to a mobile device 102 via NFC. In an alternative architecture, the location identifier may be associated with one or more content management servers 109 or a backend merchant server 110.

Mobile device 102 may initiate a wallet application 112 upon interfacing with smart tag 118 on smart poster 116. In one embodiment, smart poster 116 advertises a single menu item/product or selection of menu items/products (e.g., a specific sandwich, a specific beverage, or a number of combo meals). In such an embodiment, mobile device 102 can tap the predefined menu selection displayed on smart poster 116 and receive information including a content product code, a location identifier (e.g., URL, IP address, or URI) associated with TMS 105. In one embodiment, each menu item selection displayed on smart poster 116 has a corresponding smart tag for interfacing. A consumer may trigger wallet application 112 to download a product selection identifier (e.g., corresponding to a desired menu item, such as a predefined meal package, a predefined beverage item, and a predefined food item), a TLC (which, e.g., discloses the location of the smart poster), and an associated CPC (which, e.g., identifies the merchant entity and/or the menu item content data to be downloaded to and displayed on mobile device 102) for a specific menu option by interfacing mobile device 102 with at least one smart tag 118 on smart poster 116.

In one embodiment, wallet application 112 may use a location identifier (e.g., a URL, URI, or IP address) contained in smart poster 116 to communicate with trigger management server 105 or backend merchant server 110 in order to obtain menu/product content and display information (e.g., mobile device-specific content and display information for a la carte menu items, sizes, quantities, etc.) regarding a particular product. For example, a wallet application 116 may be configured to contact a trigger management server 105 using the location identifier and provide TMS 105 with a CLC. TMS 105 may use the CLC to determine the appropriate content management server (CMS) capable of accessing the desired content data (e.g., menu item content data) advertised by smart poster 116. Once the appropriate CMS (e.g., CMS 109) is determined, TMS 105 forwards the CLC along with the customer identifier to CMS 109. Using the CLC, CMS 109 may then contact the appropriate content provider (i.e., backend merchant server 110) and obtain the desired menu content data by providing the associated menu item identifier. For example, merchant server 110 may use the CLC to access and extract menu/product content data from a content database 111 and subsequently provide the content data to CMS 109. Upon receiving the desired menu content data, CMS 109 then provides the desired menu content data along with the customer phone number (e.g., customer identifier) to OTA provisioning server 107, which then downloads the menu content data to be displayed mobile device 102. At that point, mobile device 102 may display the menu content data and prompt the customer with two options: "Order and Pay" or "Create and Submit Order".

In one embodiment, the "Order and Pay" option may be selected to wirelessly communicate the order and payment information and a customer identifier (e.g., mobile phone number) to backend merchant server 110 (via TMS 105 and CMS 109) to initiate a purchase transaction. If the mobile device 102 is used to select the "Order and Pay" option, wallet 112 sends at least the menu item identifier, a customer identifier (e.g., the mobile device phone number), and payment credentials to merchant server 110. In one embodiment, payment credentials are based on either a default softcard setting for any payment or based on a payment option that is predefined by the merchant store. If both payment options are set, then the payment option predefined for the specific store takes precedence. If no payment option is set, the user of mobile device 102 will be prompted to select a payment instrument from a list of payment credential instruments mobile device 102 has in wallet 112. In one embodiment, payment credential data to be used in the purchase transaction is provided by wallet application 112 to backend merchant server 110 via TMS 105 and CMS 109. Backend merchant server 110 is then responsible for communicating with payment servers (not shown) to properly conduct proper payment procedures. After a successful transfer of funds, backend merchant server 110 may communicate a message indicating a successful purchase transaction to CMS 109, which in turn notifies mobile device 102 via OTA provisioning server 107.

Alternatively, upon selection of the "Create and Submit Order" option, the consumer is presented with choices and can make the appropriate menu selections. The menu selection or order, payment credentials, and the phone number of NFC enabled device 102 can then be communicated to merchant server 110 (via TMS 105 and CMS 109) for processing. An exemplary purchase credential may include an electronic payment softcard residing in wallet application 116. If no payment option is set, the user may be prompted to select a payment instrument from the list of payment instruments available in wallet application 116. Notably, the purchase for the desired product is conducted in a manner that bypasses (or obviates the need for) a payment register and/or cashier in a retail location of the merchant (e.g., without interacting with a sales clerk and/or without the use a payment register or point of sale terminal). Like with the "Pay and Order" option, payment credential data to be used in the purchase transaction involving the "Create and Submit Order" option is provided by wallet application 112 to backend merchant server 110 via TMS 105 and CMS 109. Backend merchant server 110 is then responsible for communicating with payment servers (not shown) to properly conduct proper payment procedures. After a successful transfer of funds, backend merchant server 110 may communicate a message indicating a successful purchase transaction to CMS 109, which in turn notifies mobile device 102 via OTA provisioning server 107.

In another embodiment, NFC enabled device 102 can customize an order by either 1) modifying a specified menu selection or 2) tap to download an a la carte menu and specify choices. For either method, users may select the "Create and Submit Order" option on mobile device 102. For orders that give the consumer the option to specify their preferences, the user may be able to download the order, modify the order (or create a new order), and submit the customized order along with payment credentials to merchant server 110. For example, if the mobile device 102 is used to select the "Create and Submit Order" option, the user is enabled to modify the existing order. Afterwards, wallet 112 submits the modified order identification, a customer identifier (e.g., the mobile device phone number), and payment credentials to the merchant server 110 (via TMS 105 and CMS 109). In one embodiment, payment credentials are based on either a default card setting for any payment or based on a payment option that is predefined by the merchant store. If both payment options are set, then the payment option predefined for the specific store takes precedence. If no payment option is set, the user of mobile device 102 will be prompted to select a payment instrument from a list of payment instruments mobile device 102 has in wallet 112.

In one embodiment, mobile device 102 may be detected when mobile device 102 is brought within a designated area 108 associated with a merchant location. In such embodiments, the customer of mobile device 102 may register with the merchant and provide a registered/recognizable identifier associated with mobile device 102 such that a detection system server 106 may be permitted to wirelessly detect mobile device 102. In an alternate embodiment, a hardware component (e.g., a hardware circuit) may be added to mobile device 102 to enable detection by system 106.

For example, designated area 108 may include a store location, a parking spot location, a parking lot location, and the like. Designated area 108 may be defined and monitored by a detection system server 106 that utilizes WiFi-based, global systems for mobile communications (GSM)-based, Bluetooth-based (e.g., Bluetooth handshaking), cellular-based, and/or global positioning system (GPS) based technologies. For example, detection system server 106 may include a WiFi based router associated with a merchant entity may detect the presence of a consumer's mobile device 102 within a WiFi range, i.e., designated area 108. Mobile device 102 may utilize a service set identifier (SSID) associated with detection system server 106 and provide an identifier that is recognized by system 106. In another embodiment, WiFi, cellular and or GPS positioning solutions using triangulation may be employed to detect mobile device 102. For example, detection system server 106 may include a plurality of routers that upon communicating with (e.g., upon receiving one or more customer presence signals that include an SSID and recognizable mobile device identifier) mobile device 102, may determine the position of mobile device 102 and be generate an alert to a merchant server upon entering a designated area (e.g., entering a store, a parking lot, or a specific parking spot).

Once identified/detected in a parking lot or at the store/restaurant entrance, detection system server 106 may communicate directly with TMS 105. For example, detection system server 106 may provide a customer identifier, a merchant identifier, and location information associated with mobile device 102 to TMS 105 and/or CMS 109. For example, CMS 109 may then use the merchant identifier to communicate with backend merchant server 110, which in turn utilizes the customer identifier to determine 1) if an order associated with the customer identifier has been previously placed (either via a website or mobile device), 2) if a stored "usual order" associated with the customer identifier is saved with backend merchant server 110 or in wallet application 112 and/or 3) if the mobile device 102 associated with the customer identifier has been registered as having a smartphone application (e.g., a menu selection application 114).

Upon determining that an order has been previously made, backend merchant server 110 may query mobile device 102 whether the order should now be processed via CMS 109 and OTA provisioning server 107. For example, OTA provisioning server 107 may query mobile device using an over the internet (OTI) server path/channel to mobile device 102 since the query comprises low security data. Notably, the OTI channel allows for faster communication with low security overhead. In an alternate embodiment, backend merchant server 110, TMS 105, and/or CMS 109 may directly communicate with mobile device 102.

Upon determining that a customer has a pre-stored/saved order, backend merchant server 110 may query mobile device 102 whether the usual order should be processed via CMS 109 and OTA provisioning server 107. For example, database 111 may be used to store saved orders previously made by a registered consumer.

Similarly, upon determining that mobile device 102 does not have a menu selection application 114, backend merchant server may utilize OTA provisioning server 107 to query the mobile device 102 if a menu selection application is desired. For example, OTA provisioning server 107 may query mobile device using an over the internet (OTI) server path/channel to mobile device 102 since the query comprises low security data. Notably, the OTI channel allows for faster communication with low security overhead. In an alternate embodiment, backend merchant server 110, TMS 105, and/or CMS 109 may directly communicate with mobile device 102. Similarly, if the user of mobile device 102 answers in the affirmative to download the offered menu selection application 114, a signal message is sent directly to TMS 105, CMS 109, or merchant backend server 105. The signal message may be sent via an OTA channel, an OTI channel, or a WIFI channel.

In one embodiment, the user may also save an order within memory 103 (e.g., wallet application 112 and/or menu selection application 114) for future reordering purposes. This is advantageous as orders can be reused without having to be recreated or reselected. In this embodiment, the consumer may use NFC enabled device 102 to specify choices from various menu item choices, sizes, and details of the product using wallet application 112 and/or menu selection application 114. The consumer may store the predefined order with an associated payment credential. This feature also simplifies the ordering process thereby saving consumers time. For example, the consumer may be notified about saved or stored orders previously placed with a given merchant, the user then has the flexibility to submit the same order or place a new order. Saved or stored orders may also be modified and resubmitted with new preferences, for example, a previous order of a hamburger cooked medium could be changed to medium-well. The new order can then be saved to NFC enabled device 102. Notably, the user of mobile device 102 may be queried as to whether the saved usual order is to be placed upon mobile device 102 being detected by detection system server 106 (e.g., entering designated area 108 and/or via detection by WiFi triangulation). Alternatively, a pre-stored order in mobile device 102 may be triggered to be processed upon tapping on (e.g., NFC interfacing with) smart poster 116 or tapping on an RF device reader at the point of sale. Also, a pre-stored order in mobile device 102 may be triggered via a menu driven screen that may be installed at a dining table, pick up area, or any other location in the restaurant or store.

Figure 2:
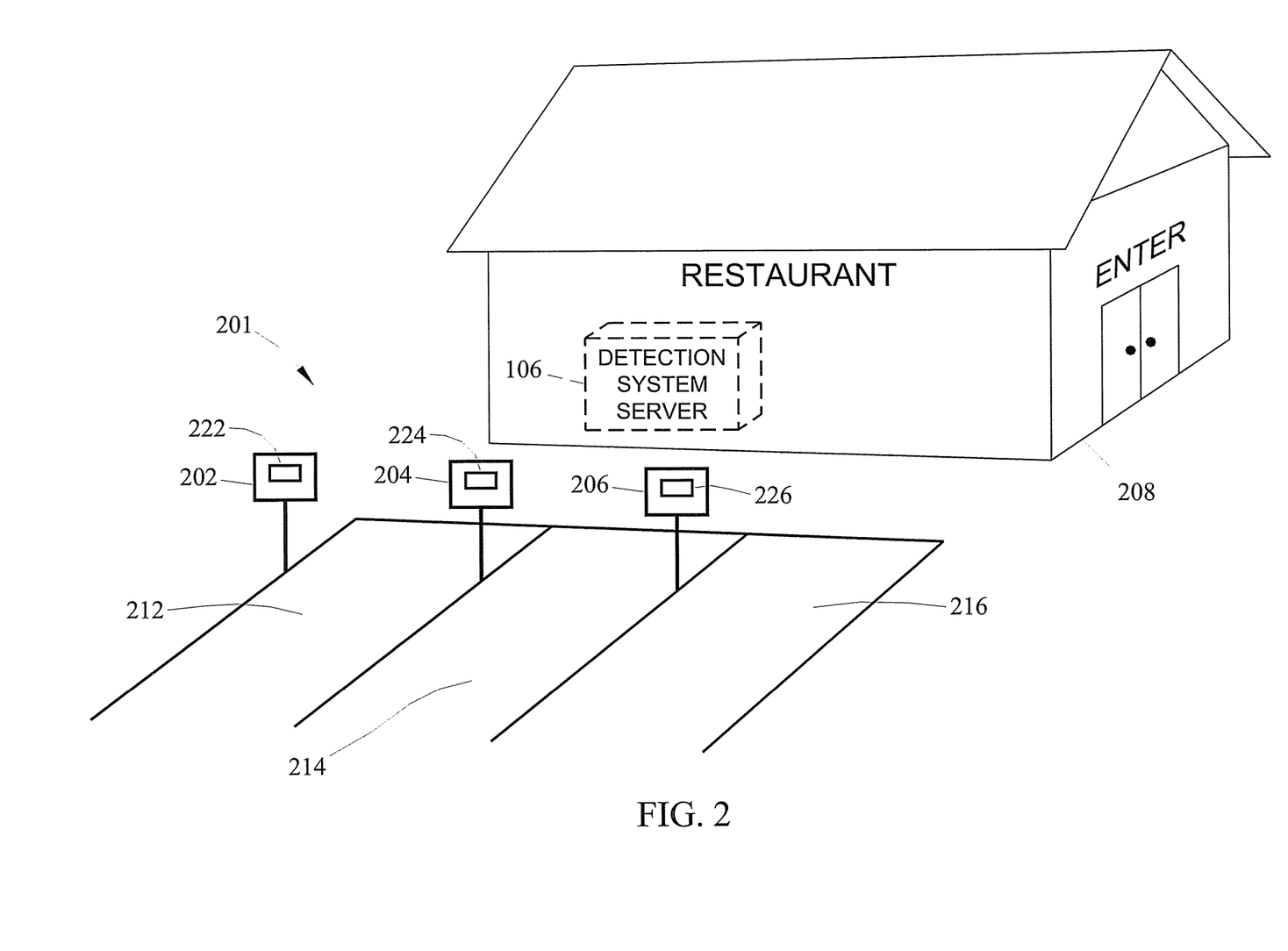
FIG. 2 is a diagram illustrating the detection of consumer presence in a parking lot and the initiation of the ordering and purchase of goods according to an embodiment of the subject matter described herein.

FIG. 2 depicts an exemplary embodiment in which consumer presence is detected in a parking lot and the initiation of the ordering and purchase of goods via a mobile device according to an embodiment of the subject matter described herein. In one embodiment, a merchant location such as restaurant 208 may be located near a parking lot area with a plurality of parking spaces 212-216. Each of parking spaces 212-216 may be equipped with its own parking spot touch point 202-206. Each of parking space touch points 202-206 may be equipped with at least one smart tag 222-226.

In one embodiment, a mobile device 102 is carried into or turned on in a designated service area (not unlike area 108 depicted in FIG. 1). A detection system server 106 in restaurant 208 may be used to monitor and define a designated area 108 by utilizing the range of WiFi-based, GSM-based, Bluetooth-based, cellular-based, and/or global positioning system (GPS) based technologies. For example, detection system server 106 may include a WiFi based router associated with a merchant entity may detect the presence of a consumer's mobile device 102 within a WiFi range, e.g., area surrounding restaurant 208.

Mobile device 102 may utilize a service set identifier (SSID) associated with detection system server 106 and provide an identifier that is recognized by system 106. In another embodiment, detection system server 106 may utilize WiFi triangulation, cellular triangulation and or GPS triangulation solutions to detect mobile device 102. For example, detection system server 106 may include a plurality of WiFi routers that upon communication with (e.g., upon exchanging WiFi signals that include an SSID and recognizable mobile device identifier) mobile device 102, may determine the position of mobile device 102. If mobile device 102 enters the restaurant 208 or is located in a particular parking spot (e.g., parking spot 212), detection system server 106 may generate an alert message to on-site merchant server 104 (not shown in FIG. 2) to indicate the location of mobile device 102. For example, certain WiFi or GPS coordinates may be predefined to correspond with a particular parking space or the entrance of restaurant 208. In one embodiment, a user of mobile device 102 may use an application to initiate communication (i.e., initiate the detection process) with detection system 106 after parking in any of parking spaces 212-216. After mobile device 102 is identified/detected in a parking space or at the store/restaurant entrance, on-site merchant server may communicate directly with TMS 105 in the manner described above.

In an alternate embodiment, a customer may park an automobile in any one of parking spaces 212-216 and, from the automobile, use a mobile device 102 to interface with a respective parking space touch point 202-206. For example, if a customer parked in parking space 212, the customer may view the parking space touch point 202 that displays a number of menu item selections (e.g., a predefined fast food combo meal, a single food item, a single beverage, or any combination thereof). The user may interface mobile device 102 with smart tag 222 that corresponds to the desired menu item. For example, the consumer may tap mobile device 102 on the ordering menu board to place the order for a pre-defined menu option package (e.g., a combination of food and/or beverage items) or select individual items to add to the pre-defined meal package or to form a complete new order. Consumers are able to select an option on their mobile device's wallet 112 and/or menu selection application 114 to obtain information on each product displayed or listed on the menu to request information or a related electronic coupon/offer. Although only one smart tag 222 is shown in FIG. 2, any number of smart tags (corresponding to any number of menu items) may be situated on parking space touch point 202 without departing from the scope of the present subject matter. Once the menu item(s) corresponding with the smart tags are tapped (i.e., NFC interfacing), wallet application 112 on mobile device 102 communicates with TMS 105 in the manner described above. However, in this embodiment, the tag location identifier may be specifically associated with a parking spot 212.

Figure 3:
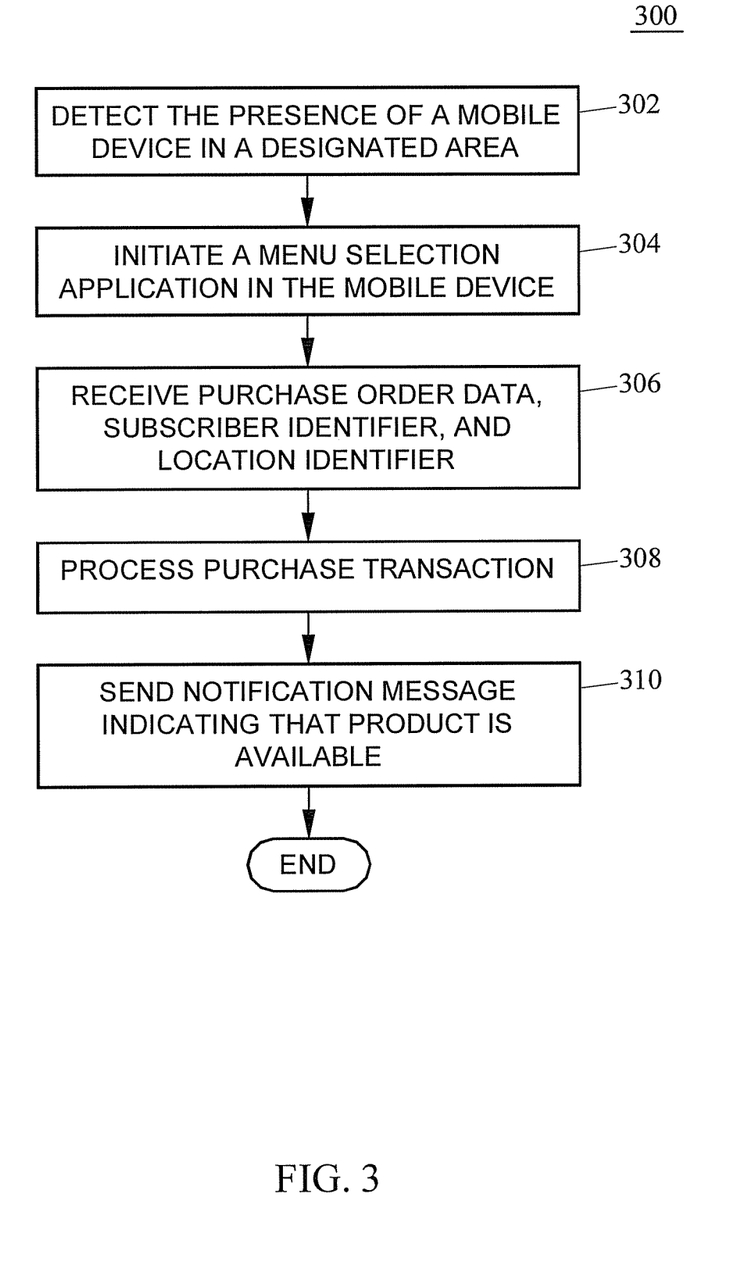
FIG. 3 is a flow chart illustrating an exemplary process for detecting customer presence to initiate the ordering and purchase of goods and services according to an embodiment of the subject matter described herein.

FIG. 3 is a flow chart illustrating an exemplary process 300 for detecting customer presence to initiate the ordering and purchase of goods and services according to an embodiment of the subject matter described herein. In block 302, the presence of a mobile device is detected. In one embodiment, a detection system server 106 (as shown in FIG. 1) at a merchant location may detect the presence of a mobile device. For example, mobile device 102 may be carried into or turned on in designated area 108 that is associated with a merchant store. Designated area 108 may be a WiFi service area that is created by a simple range-based WiFi detection system server 106 in a merchant store. In one embodiment, the designated area 108 is defined by the range of a WiFi router. For example, the designated are may include the merchant store and/or a store parking lot (or at least a portion thereof) that is contained within the range of a WiFi router. In an alternate embodiment, detection system server 106 may utilize a plurality of routers to detect the presence of the mobile device via WiFi triangulation. In yet another embodiment, cellular (e.g., GSM) triangulation and/or GPS triangulation solutions may be employed to detect the presence of a registered mobile device. Notably, detection system server 106 is configured to recognize a consumer's mobile device presence in a designated area (e.g., a store entrance or a parking lot space). In yet another embodiment, mobile device 102 may be interfaced with or tapped on a smart poster in merchant store 204 or other area (e.g., a smart poster located at a parking space).

In one embodiment, a merchant entity may provide a WiFi based detection system 106 to recognize the presence of a consumer's mobile device in its parking lot or at the store/restaurant entrance and initiate a dialogue with customers to allow them to place an order for pre-defined meal/food/coffee/general products package(s) menu displayed on the mobile device screen as well as to select individual items to add to the pre-defined meal/food/coffee/general products package. Consumers should be able to select an option on the mobile device wallet to get information on each product displayed or listed on menu to get information or get a coupon/offer for.

In block 304, a menu selection application in the mobile device is initiated. In one embodiment, wallet 112 in mobile device 102 is triggered to execute (along with a hardware based processor) a menu selection application 114. Wallet application 112 may be triggered either by a signal message from OTA provisioning server 107 or by mobile device 102 interfacing with a touch point (e.g., smart poster 116). For example, a consumer may enter a merchant store offering goods and/or services advertised from pre-defined menus. The consumer may tap a smart tag corresponding to a specific menu option which downloads the order to mobile device 102. This action prompts the wallet application 112 and/or menu selection application 114 to execute and prompt the user with "Order and Pay" option or the "Create and Submit Order" as disclosed above. The user's selection of either option sends the order and the payment credential information, via TMS 105 and/or CMS 109, to a backend merchant server 110 (e.g., a store ordering system) to process the order and the payment.

In block 306, purchase order data, a customer identifier, and a location identifier is received. In one embodiment, merchant server 110 receives the purchase order data (i.e., the payment credential data and the product selection identifier) from mobile device 102 either directly or via TMS 105 and/or CMS 109 (depending on the location identifier URI/URL/IP address). Merchant server 110 may also receive purchase order data, a customer identifier (e.g., a mobile phone number) associated with the mobile device 102, and a location identifier associated with the service area 108 (e.g., a store location or a parking spot location). Once backend merchant server 110 receives the payment credential data, customer identifier, and product selection identifier (e.g., menu item selection identifier), merchant server may initiate the purchase transaction.

In block 308, the purchase transaction is processed. In one embodiment, payment credential data to be used in the purchase transaction is provided by wallet application 112 to backend merchant server 110 via TMS 105 and CMS 109. Backend merchant server 110 is then responsible for communicating with payment servers (not shown) to properly conduct proper payment procedures. After a successful transfer of funds, backend merchant server 110 may communicate a message indicating a successful purchase transaction to CMS 109, which in turn notifies mobile device 102 via OTA provisioning server 107. Backend merchant server 110 may also notify on-site merchant server 104 of the successful purchase transaction by sending a notification message that includes at least the customer identifier, payment amount information, and the menu item selection identifier. The successful purchase transaction notification may also be provided to a point of sale machine at the merchant location by on-site merchant server 104.

In block 310, a notification message indicating that the product is available is sent. For example, when the product is prepared and/or ready to be delivered by the merchant entity, on-site merchant server 104 associated with the store location (e.g., restaurant, fast food restaurant, retail store, or merchant entity) sends a notification message (e.g., SMS/MMS or email) to the customer's mobile phone 102 that the purchased product (e.g., food item, beverage item, combo meal, groceries, general merchandize, etc.) is ready to be picked up from the merchant location (e.g., inside the store or a drive-thru window, or a designated parking space). Alternatively, the notification message sent to the consumer's mobile device 102 may indicate that the product is available and will be delivered to the specific parking spot or table indicated by the associated location identifier. In one embodiment, the customer identifier is utilized to send the notification message.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for detecting customer presence to initiate the ordering and purchase of goods and services, the system comprising:
    a trigger management server (TMS) configured to receive a customer identifier associated with a mobile device and purchase order data including payment credential data and a product selection identifier for an order of at least one product from the mobile device, wherein the mobile device receives a location identifier associated with the TMS and the product selection identifier upon interfacing with a smart tag, wherein the interfacing with the smart tag initiates a menu selection application in the mobile device for placing the order, and wherein the mobile device is configured to utilize the location identifier received from the smart tag to communicate with the TMS; and
    a backend merchant server configured to receive, from the mobile device via the TMS, the purchase order data, wherein the payment credential data received by the backend merchant server includes electronic payment softcard data that is provided by a wallet application stored in memory in the mobile device, to utilize the customer identifier to send a notification message that indicates that the at least one product is available to the mobile device, and to send a notification message to an on-site merchant server located at a merchant location indicating that the purchase transaction has been successfully conducted by the backend merchant server.

2. The system of claim 1 wherein the product selection identifier includes at least one identifier associated with a predefined meal package, a predefined beverage item, and a predefined food item.

3. The system of claim 1 wherein the smart tag is located at a parking spot.

4. The system of claim 1 wherein the merchant server uses the location identifier to determine the designated location in which the at least one product is to be delivered.

5. The system of claim 1 wherein the mobile device interfacing with the smart tag triggers the menu selection application in the mobile device to display a menu selection associated with the at least one product.

6. The system of claim 5 wherein the menu selection application in the mobile device enables a user of the mobile device to modify features of the menu selection.

7. A method for detecting customer presence to initiate the ordering and purchase of goods and services, the method comprising:
    receiving, by a trigger management server (TMS), a customer identifier associated with a mobile device and purchase order data including payment credential data and a product selection identifier for an order of at least one product from the mobile device, wherein the mobile device receives a location identifier associated with the TMS and the product selection identifier upon interfacing with a smart tag, wherein the interfacing with the smart tag initiates a menu selection application in the mobile device for placing the order, and wherein the mobile device is configured to utilize the location identifier received from the smart tag to communicate with the TMS;
    receiving, at a backend merchant server from the mobile device via the TMS, the purchase order data, wherein the payment credential data received by the backend merchant server includes electronic payment softcard data that is provided to the backend merchant server by a wallet application stored in memory in the mobile device
    sending, by the backend merchant server, a notification message to an on-site merchant server located at a merchant location indicating that the purchase transaction has been successfully conducted by the backend merchant server; and
    utilizing the customer identifier to send a notification message that indicates that the at least one product is available to the mobile device.

8. The method of claim 7 wherein the product selection data includes at least one identifier associated with a predefined meal package, a predefined beverage item, and a predefined food item.

9. The method of claim 7 wherein the smart tag is located at a parking spot.

10. The method of claim 7 comprising using the location identifier to deliver the at least one product to the designated location.

11. The method of claim 7 wherein initiating a menu selection application in the mobile device further comprises displaying a menu selection associated with the at least one product.

12. The method of claim 11 wherein initiating a menu selection application in the mobile device further comprises triggering a menu selection application in the mobile device that enables a user of the mobile device to modify features of the menu selection.

13. A non-transitory computer readable medium having stored thereon comprising computer executable instructions that when executed by a processor of a computer control the computer to perform steps comprising:

receiving, by a trigger management server (TMS), a customer identifier associated with a mobile device and purchase order data including payment credential data and a product selection identifier for an order of at least one product from the mobile device, wherein the mobile device receives a location identifier associated with the TMS and the product selection identifier upon interfacing with a smart tag, wherein the interfacing with the smart tag initiates a menu selection application in the mobile device for placing the order, and wherein the mobile device is configured to utilize the location identifier received from the smart tag to communicate with the TMS;

receiving, at a backend merchant server from the mobile device via the TMS, the purchase order data, wherein the payment credential data received by the backend merchant server includes electronic payment softcard data that is provided to the backend merchant server by a wallet application stored in memory in the mobile device     sending, by the backend merchant server, a notification message to an on-site merchant server located at a merchant location indicating that the purchase transaction has been successfully conducted by the backend merchant server; and     utilizing the customer identifier to send a notification message that indicates that the at least one product is available to the mobile device.

\* \* \* \* \*